Oct. 12, 1943.  E. A. JONES  2,331,476
CONTROL SYSTEM FOR HEATING DEVICES
Filed July 25, 1940  4 Sheets-Sheet 1

INVENTOR.
EDWIN A. JONES
BY
ATTORNEY.

Oct. 12, 1943.　　　　E. A. JONES　　　　2,331,476
CONTROL SYSTEM FOR HEATING DEVICES
Filed July 25, 1940　　　　4 Sheets-Sheet 4

INVENTOR.
EDWIN A. JONES
BY
ATTORNEY.

Patented Oct. 12, 1943

2,331,476

UNITED STATES PATENT OFFICE 2,331,476

CONTROL SYSTEM FOR HEATING DEVICES

Edwin A. Jones, Shorewood, Wis.

Application July 25, 1940, Serial No. 347,371

24 Claims. (Cl. 236—9)

This invention relates to control means and to a system of control for heating devices.

In order to simplify the description, the invention will be described as applicable to the heating of a building or house, for example, although it is to be distinctly understood that the invention is also applicable to the control of industrial installations in processes where accurate control of heat is involved.

Objects of this invention are to provide a system of control for heat exchange means which will prevent too rapid an increase or decrease in temperature of the heating device while still retaining the possibility of quick response of the heating device when needed.

In greater detail, further objects are to provide a control means and a system of control for heating devices, for example furnaces, which is so made that the furnace is allowed to heat up in a step by step manner, one of the control devices being placed at a point where it quickly responds to the heat from the furnace or heating medium, in which motor means are provided for reducing the flame at the burner which is caused to wait a predetermined period of time to ascertain if a sufficient amount of heat has been furnished the house, and is thereafter allowed to function to allow a greater supply of fuel to the burner in the event sufficient heat has not been furnished the house, and thus in a step by step manner feels out, so to speak, the demand for heat, the control means being so constructed that it operates independently of the actual temperature of its thermally responsive parts but operates primarily in response to a sudden increase or decrease in temperature rather than responding to the actual temperature.

In further detail, further objects are to provide a control means which includes reversely acting motor means which operates through reduction gearing to control either an auxiliary modulating valve, which in turn controls a main modulating valve, or which directly controls a modulating valve to thereby modulate either the flow of one ingredient of a combustible mixture or the flow of a heating means, or the relative flow of heating and cooling means, the reversely acting motor means being in turn under the control of a main thermostat and a thermally responsive time delay means, which latter will cause a step by step action of the motor means in either direction.

Further objects are to provide a control device and a system of control in which the reversely acting motor means are provided which are in turn controlled by a thermally actuated time delay device for causing a step by step action in either direction of the motor means, and which is also controlled by a room or other main thermostat, the room or main thermostat being so constructed that ordinarily it will work in conjunction with the step by step thermal time delay means but which under an excessive demand for a change in temperature, will cut out the step by step thermal time delay means so that such means has, during this interval, no control on the reversely acting motor means.

This invention has for its further object, the provision of reversely acting motor means in a system of control which may operate a modulating pilot valve to thereby modulate a main modulating regulator valve, such latter being so connected in the system that it first allows one ingredient of a combustible mixture to come on at regulated pressure and thereafter modulates such ingredient in accordance with the action of the reversely acting motor means, such reversely acting motor means being also so arranged that it can directly control a modulating valve to thereby directly modulate the supply of a heating medium, or which may directly modulate a valve construction which will proportion the amount of hot and cold air supplied a building or other space.

In still greater detail, further objects are to provide a reversely acting motor means which is controlled from a main thermostat, such as a room thermostat, and from a step by step thermally actuated time delay device, such reversely acting motor means operating a modulating valve in a graduated manner to provide for a floating operation of the valve, either towards open or towards closed position, limit means being provided to arrest the operation of the motor means at the limit of either direction of operation.

Embodiments of the invention are shown in the accompanying drawings, in which.

Figure 3:
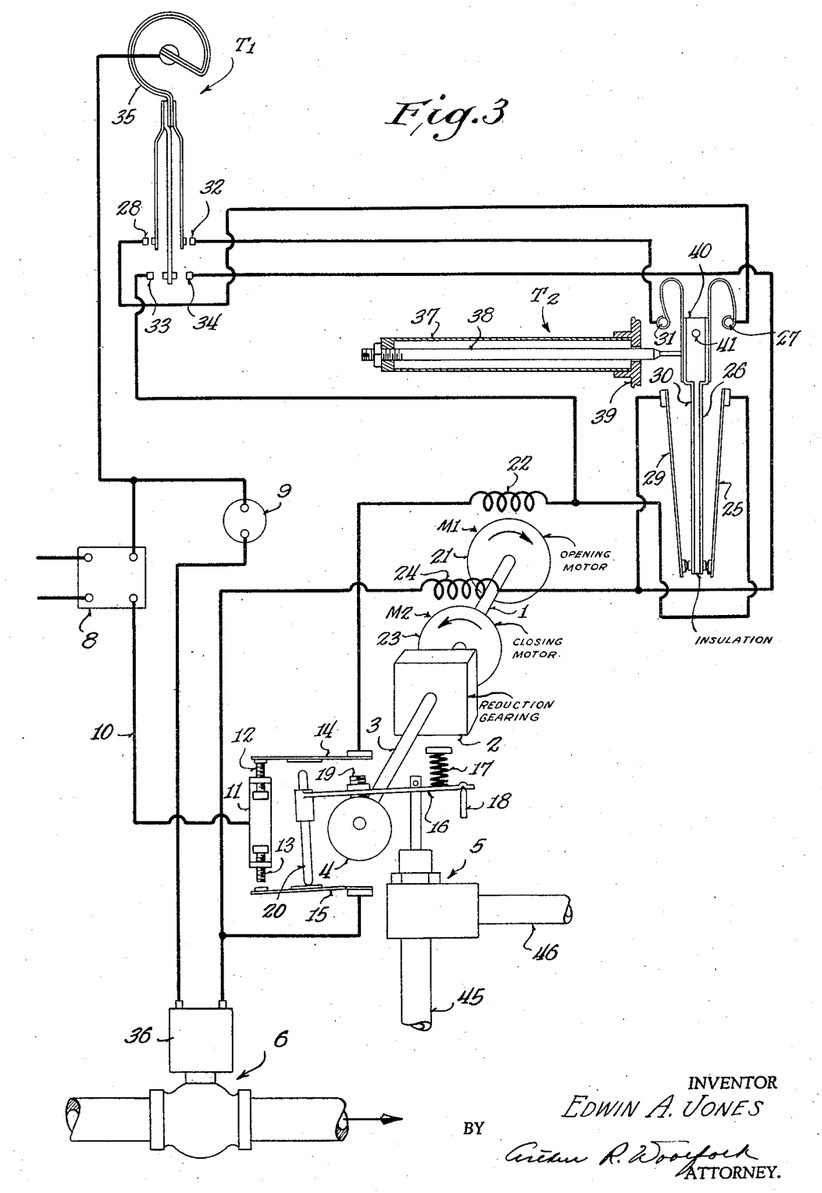
Figure 3 is a diagrammatic view showing the reversely acting motor means, the step by step thermally actuated time delay means, the room thermostat, and the on and off electric valve, together with a wiring diagram of the system.

It is believed that a better understanding of the invention will be obtained by first discussing the diagrammatic showing and the wiring diagram of Figure 3. The actual and relative positions of the parts will be described in detail hereinafter in discussing the other figures.

Referring to Figure 3, it will be seen that the entire system is controlled from a main thermostat indicated generally at $T_1$. This main thermostat may be a room thermostat, for instance, or may be located wherever desired. This main thermostat controls two reversely operating electric motors, one of which may be called an opening motor and the other a closing motor indicated generally at $M_1$ and $M_2$.

These reversely operating motors may be of any suitable type but are preferably of the self-starting synchronous type. They are rigidly connected by a common shaft 1 which, through a high reduction gearing indicated generally at 2, drives the cam shaft 3. A cam 4 is rigidly carried by the shaft 2 and is slowly driven in one or the other direction, depending on whether the opening motor $M_1$ or the closing motor $M_2$ is in operation. These motors are selectively controlled by the main thermostat $T_1$. However, the control is interrupted periodically, under certain conditions which will hereinafter be described, by a thermal time delay means indicated generally at $T_2$.

This thermal time delay means is located at a point where it is quickly affected by the heat from the burner for instance, or by a part of the circulating medium, or at all events, at a point where it responds very quickly for any increase or decrease of temperature, whereas the main thermostat $T_1$ is located at the point or in the space to be heated and may be relatively remote from the burner or other heating medium.

The purpose of this relation of the parts is to prevent too rapid a heating or too rapid a cooling and to cause the apparatus to operate in a step by step manner.

The cam 4 in the form shown in Figure 3 controls an auxiliary throttling valve indicated generally at 5 and this throttling valve, as will appear hereinafter, controls a modulating regulator which in turn controls the flow of fuel to a burner for the form shown in Figures 1 and 3.

The modulating regulator may control either ingredient of the combustible mixture. It will be described as controlling the supply of fuel such as gas, though it obviously could control the flow of air, in which case it would be used in conjunction with the ordinary zero pressure regulator, which in turn would control the flow of gas.

Figure 1:
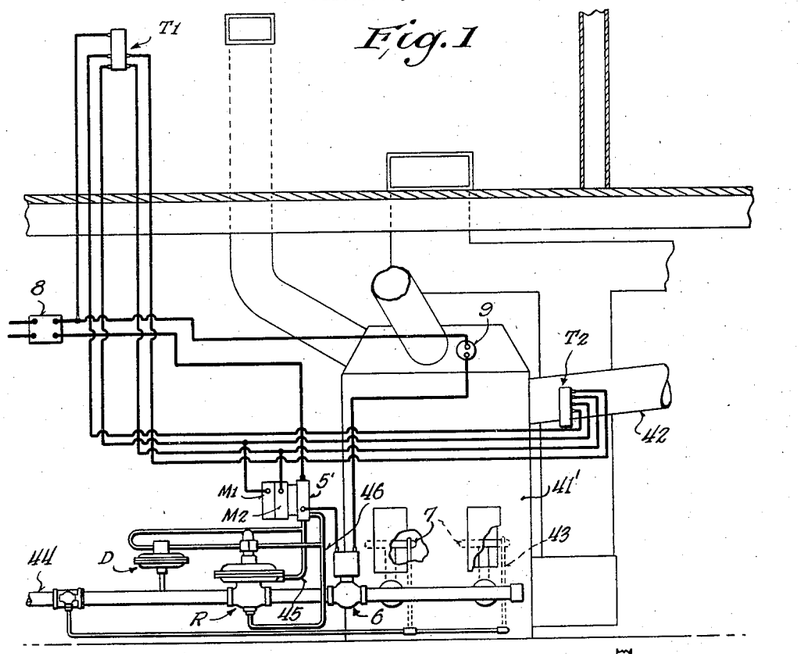
Figure 1 shows the control apparatus applied to a furnace, such view having parts broken away.

A main on and off valve indicated generally at 6 is provided for the fuel supply and is located between the modulating regulator indicated generally at R in Figure 1 and the burner means 7.

A small step-down transformer 8, see Figure 3, provides the electrical energy for operating the apparatus. It is to be noted also from Figure 3 that a limit control, such as a thermostat 9 which may be located in the bonnet of the furnace or wherever desired, is provided in the system and operates in the usual manner of such limit controls.

Referring in detail to Figure 3, it will be seen that the transformer 8 has one side of the secondary connected by means of the conductor 10 with a stationary contact member 11 which is provided with adjustable upper and lower stationary contacts 12 and 13. These stationary contacts 12 and 13 cooperate respectively with the limit switches 14 and 15 which may be spring arms which are adapted to be operated from the cam follower lever 16, such last mentioned lever cooperating with the cam 4 and being urged downwardly by means of the spring 17 and pivoted, for example, upon the knife edge 18.

This cam follower lever 16 is provided with an adjustable member 19 which may bear upon the face of the cam. It is also provided adjacent its outer end with a rod 20 which may be of insulating material and which operates the upper and lower limit switches 14 and 15. The upper limit switch 14 controls the opening motor and the lower limit switch 15 controls the closing motor, and the on and off valve 6, it being noted that the on and off valve is an ordinary type of electric on and off valve.

A simple form of motor which is eminently suited to this system is the self-starting type of synchronous motor and such has been indicated for the opening and closing motors $M_1$ and $M_2$. The opening motor comprises the armature 21 and the field 22 and the closing motor comprises the armature 23 and the field 24.

Tracing the circuit from the lower terminal of the step-down transformer 8, it is apparent that such lower terminal, in the position of the parts shown in the drawing, is connected through the conductor 10 to the contact member 11, and from the upper limit switch 14 to the field 22. From this point the connection extends to the spring arm or relatively stationary contact arm 25 of the thermal time delay device or step by step device. The relatively stationary contact arm 25, which will hereinafter be referred to as one of the stationary contact arms of the time delay step by step device, is provided with a contact which is normally in engagement with the contacting portion 26. This contacting portion is connected to the terminal 27 and from this point to the contact 28 of the main thermostat $T_1$.

One side of the field 24 of the closing motor is connected to the lower limit switch 15 and the other side of the field is connected to the spring arm or relatively stationary contact 29 of the device $T_2$.

This relatively stationary contact arm, which will hereinafter be referred to as a stationary contact of the device $T_2$, is provided with a contact at its outer or free end which normally engages the conducting portion 30 of the device $T_2$. This conducting portion is connected to the terminal 31 and from thence to the contact 32 of the main thermostat $T_1$. It is to be noted from Figure 3, that the lower contact 33 below the contact 28 of the main thermostat $T_1$ and the lower contact 34 below the contact 32 are respectively connected to one side of the fields 22 and 24 of the opening and closing motors for a purpose hereinafter to appear. These contacts 33 and 34 may be omitted when not deemed necessary.

The bi-metallic strip 35 of the main thermostat $T_1$ is connected to the other side of the secondary of the transformer 8. Such other side of the secondary of the transformer is also connected through the limit control 9 to one terminal of the solenoid indicated generally at 36 of the electric on and off valve 6. The other terminal of such electric valve is connected to the lower limit switch 15.

Figures 4, 5:
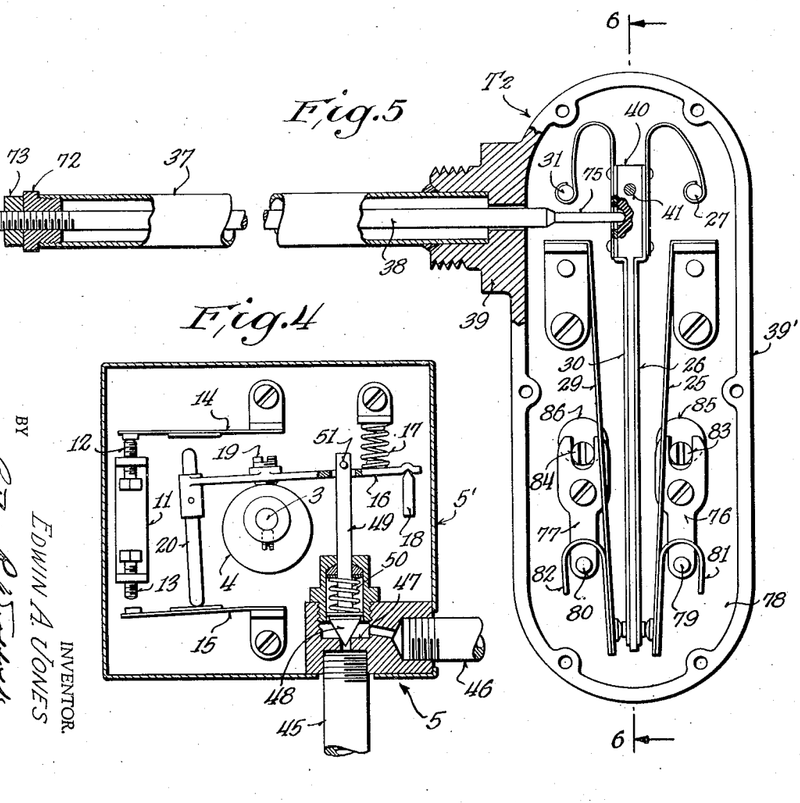
Figure 4 is a sectional detail of the auxiliary throttling valve which is actuated by the reversely acting motor means.
Figure 5 is a view partly in section of the step by step thermally actuated time delay means.
Figure 6:
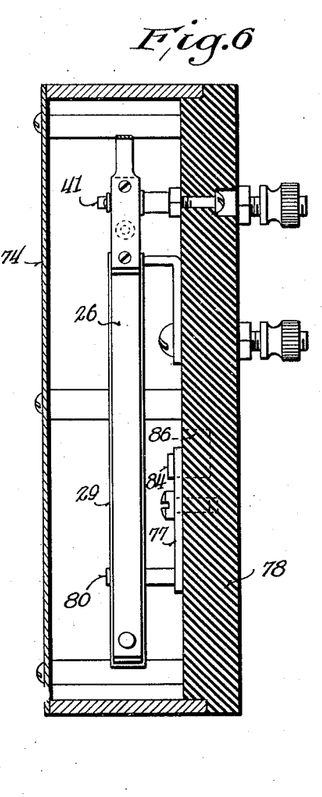
Figure 6 is a sectional view approximately on the line 6—6 of Figure 5.

Before describing the operation of the circuit and the associated parts shown in Figure 3, it is to be noted, as will hereinafter appear, that the thermally actuated time delay device or step by step device T₂ is provided with an outer shell 37 and an inner rod 38 which are either of exactly the same material or else are of materials having substantially the same coefficient of expansion. The tube 37 is rigidly carried by the body portion 39 of its structure while the rod 38 extends through this stationary portion and bears against a part of the rocking lever 40 of the step by step device, such portion 40 being of insulating material and being pivoted as indicated at 41, all as will appear in greater detail when the actual structure of this device as shown in Figures 5 and 6 is described.

It is apparent, therefore, that when this device is located at a place where it responds very quickly to any change in temperature due to the operation of the burner for example, as for instance when it is installed in the smoke pipe as shown in Figure 1, that after the burner has operated a short time, the outer tube 37 will expand, whereas the rod 38 has not yet received sufficient heat to keep up with the expansion of the tube 37. The consequence of this is that the rod 38 is drawn to the left as viewed in Figure 3, and the connection between the members 26 and 25 is interrupted and consequently the circuit of the opening motor is interrupted. After an interval of time, however, the expansion of the rod 38 will catch up with the expansion of the tube 37 and the parts of the device T₂ will then assume their normal position as shown in Figure 3, thus allowing the opening motor to continue its opening operation.

On the other hand, if the temperature in the flue, for instance, should drop too rapidly, it is apparent that the contraction of the outer sleeve 37 will be faster than the contraction of the inner rod 38, with the consequence that the member 40 of the device T₂ will be moved to the right, thus opening the circuit of the closing motor. However, after an interval of time, the contraction of the outer tube 37 and the rod 38 will be the same and the parts will assume their normal position as shown in Figure 3, thus reestablishing the circuit of the closing motor.

From the description thus far given, it is apparent that the main thermostat T₁ selectively controls the operation of the opening and closing motors and that this control of these motors from the main thermostat is periodically interrupted when too quick a change in temperature immediately adjacent the burner, for instance, occurs, and that the control is reestablished after this change in temperature has persisted for a predetermined interval of time.

It is to be noted also that if the main thermostat T₁ should move to either the left or the right beyond the point where the contacts 28 or 32 are engaged, that it will engage the stationary contacts 33 or 34 respectively. When so engaged, it is apparent that the step by step device T₂ is bridged or by-passed and the control of the opening or closing motor is not interrupted by the step by step thermal time delay device T₂. The purpose of this will appear hereinafter.

It is to be understood that each of the stationary contacts 28, 32, 33 and 34 is adjustable and that the arms carrying the corresponding contacts for engagement therewith are yielding spring arms.

Figure 1 shows the device applied to an ordinary type of hot air furnace merely for the sake of one illustration of its applicability, it being understood that the device can be applied to other types of heating equipment, whether of the house heating type or of the industrial installation type.

In Figure 1 it will be seen that the furnace has been indicated by the reference character 41' and has been shown as provided with a smoke pipe 42 within which the time delay thermostatically operated step by step device T₂ is installed, the contact portions of the device being located externally of the smoke pipe and the thermally responsive members, namely, the tube 37 and rod 38, being located within the smoke pipe. The limit control 9 is located in the bonnet of the furnace in the usual manner. The furnace has been illustrated as a gas-fired furnace in which the burner means 7 are provided with the pilot lights 43 and in which the gas supply pipe is indicated by the reference character 44. This gas supply pipe passes first to the modulating regulator R and then to the on and off valve 6, and from there passes to the burner means 7.

The opening and closing motors M₁ and M₂ are indicated generally in Figure 1, the auxiliary throttling valve 5 being located within the housing 5' of Figure 1. The pipes leading to the auxiliary throttling valve 5 are indicated in Figures 1, 3 and 4 by the reference characters 45 and 46.

The auxiliary throttling valve 5 is shown in detail in Figure 4 and it will be seen that it comprises the valve seat portion 47 and the cooperating valve 48. The valve 48 is carried by a stem 49 and is spring urged towards closed position by means of the spring 50. The stem 49 extends loosely through an opening in the cam follower or lever 16 and is provided with a transversely extending pin 51 located on the upper side and adapted to be engaged by the lever 16 to thus raise the valve towards open position against the action of the spring 50.

It is obvious that the adjustment of the member 19 provides any desired amount of lost motion, and it is also clear that the adjustment of the contacts 12 and 13, together with the adjustment of the member 19, determines the points at which the opening and closing motors will have their circuits opened and closed.

Figure 2:
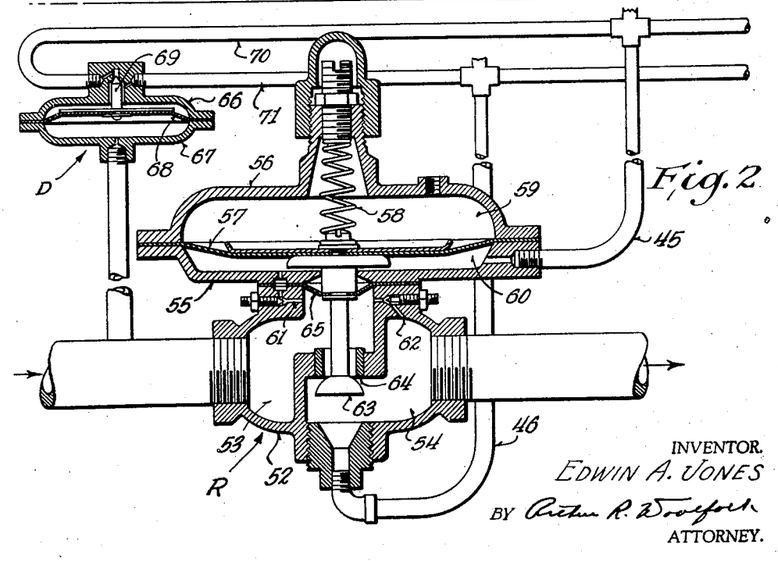
Figure 2 is a view showing in section a modulating regulator and a fluid actuated time delay device.

The modulating regulator R and a fluid actuated time delay means indicated generally at D in Figures 1 and 2, are described in detail in my copending application Serial No. 337,133 filed May 25, 1940, for Control means for heating devices.

The modulating regulator comprises the body portion 52 which is provided with an inlet chamber 53 and an outlet chamber 54. This body portion carries the lower and upper casing members 55 and 56 between which a diaphragm 57 is positioned. This diaphragm is spring biased downwardly by means of the spring 58 whose degree of compression may be adjusted, as is obvious from an inspection of Figure 2.

The diaphragm 57 divides the upper casing portion of the structure into an upper chamber 59, which is freely vented to the air as indicated, and a lower chamber 60. The lower chamber communicates with the inlet chamber 53 of the body portion by means of a regulatable pressure inlet bleed 61.

A regulatable by-pass or minimum flame by-pass 62 is provided between the inlet chamber 53 and the outlet chamber 54 of the body portion so that when the modulating regulator valve 63 fully engages its seat portion 64, there nevertheless will be minimum flame by-pass provided by the structure. A small freely flexible sealing diaphragm 65 seals the inlet chamber 53 from the chamber 60.

The bottom chamber 60 is provided with the pipe 45 previously described which constitutes a bleed line pipe and extends to the auxiliary throttling valve indicated generally at 5. The pipe 46 leads from the auxiliary throttling valve 5 to the outlet chamber 54 of the modulating regulator. It is apparent, therefore, that if the time delay valve D hereinafter described in greater detail is in the closed position as shown in Figure 2, that pressure will build up below the diaphragm 57 in the chamber 60, being supplied through the small passageway 61 from the high pressure side of the mains.

As the throttling valve 5 opens up, this pressure is relieved to a greater and greater extent as the pressure gas in the chamber 60, see Figure 2, is discharged to the outlet chamber 54 of the modulating regulator and thus the diaphragm 57, which is spring pressed downwardly, descends and moves the valve 63 downwardly, thus increasing the opening through the modulating regulator and allowing an increase in flow of fuel to occur. Obviously when the auxiliary throttling valve 5 closes, the modulating regulator will also close as the bleed from the chamber 60 is now cut off and pressure builds up and closes the modulating regulator. However, a minimum flame supply is by-passed through the passage 62.

The fluid actuated time delay means D consists of a casing having the upper and lower casing members 66 and 67 between which a diaphragm 68 is mounted. The diaphragm is freely flexible and is weighted so that it is biased downwardly. It carries a small needle valve or cut off valve 69 which is adapted to cut off communication between the pipes 70 and 71 when the pressure above the diaphragm 68 is relieved, as shown in Figure 2, the pressure fluid above the diaphragm 68 freely passing from the pipe 71 to the pipe 46 and from there to the outlet chamber 54 of the modulating regulator. This is the position of the parts when the main on and off valve 6 is open and the modulating regulator is in its open position.

The pipe 70 communicates with the pipe 45 and it will be noted that the fluid actuated time delay means D constitutes a by-pass around the auxiliary throttling valve 5, as is apparent from an inspection of Figures 1, 2 and 4.

When the apparatus is in operation, that is to say, when the burners are being supplied with fuel, the time delay means D has its diaphragm 68 in its uppermost position as shown in Figure 2. It is apparent that when the on and off valve 6, see Figure 1, closes, that pressure builds up in the outlet chamber 54 of the modulating regulator, see Figure 2, and consequently pressure builds up on the upper side of the diaphragm 68 of the fluid actuated time delay means D. Consequently, inasmuch as the pressures are now equal on opposite sides of the diaphragm 68, such diaphragm descends and fully opens the valve, thus by-passing the auxiliary throttling valve 5 as the pipes 70 and 71 now directly connect the bleed line 45 with the exhaust pipe 46 leading to the outlet chamber 54 of the modulating regulator. The modulating regulator, however, moves its valve 63 upwardly to closed position as pressure builds up below its diaphragm 57.

When the main on and off valve 6 is opened, the time delay means D does not immediately close its valve 69 as it takes a predetermined interval of time for gas pressure to build up below the diaphragm 68 due to the restricted inlet opening leading to the space below such diaphragm. This opening may be regulated as described in greater detail in my above noted copending application, or it may have a fixed value, but at all events, the time of closing of the valve 69 is predetermined. When the valve 69 is in open position, it is to be understood that a free and substantially unrestricted passage is provided from the chamber 60 below the diaphragm 57 of the modulating regulator R to the outlet chamber 54 of such modulating regulator, and in view of the fact that the main on and off valve 6 is now open, it is apparent that the pressure fluid in the chamber 60 is freely vented to the discharge side of the modulating regulator and consequently the modulating regulator moves to open position whether or not the auxiliary throttling valve 5, see Figures 1 and 4, is open or closed. Thus a certain time interval is allowed whereby a full flow of fuel to the burners is provided so as to insure proper ignition of the fuel at the burners. Thereafter when the fluid actuated time delay device D closes and cuts off direct communication between the chamber 60 of the modulating regulator and its outlet chamber 54, the auxiliary throttling valve 5 assumes control and the modulating regulator moves towards modulating position, depending on the setting then obtaining for the auxiliary throttling valve 5.

The thermally actuated time delay step by step device T2 is shown in detail in Figure 5. The outer tube 37 and the inner rod 38 may be both formed of copper or any other suitable material having either the same or substantially the same coefficient of expansion. It is apparent that the tube 37 could be provided with apertures which may or may not be provided with an adjustable slide to open or close more or less of the apertures, as disclosed in greater detail in my copending application Serial No. 340,452, filed June 14, 1940, for Control means and system of control for heating devices. The time delay interval is determined by the relative time it takes to raise or lower the outer tube 37 and the inner rod 38 to approximately the same temperature. This also may be determined by the relative mass of the two members.

The rod 38 is adjustably mounted as by screwing its end into a fitting 72 rigid with the outer end of the tube 37, a suitable lock nut 73 being provided for locking it in its adjusted position. The tube 37 is brazed or otherwise rigidly secured to the body portion or relatively fixed portion 39 which may be continued to form a casing member 39' within which the contact members 25, 26, 29 and 30 previously described are housed, a suitable cover plate 74, see Figure 6, being provided for the casing.

The rod 38 is provided with a reduced extension 75, see Figure 5, which sockets within a rounded socket portion formed in the insulating body or lever 40 of the rocking portion of the device. The contacts adjacent such socket portion are cut away as shown in Figure 5, so that the rod is insulated from any live portion of the apparatus. The normal position of the parts is shown in Figure 5 where the tube 37 and rod 38 are at substantially the same temperature. The operation of this apparatus has been previously described and it is to be borne in mind that either the opening or closing motor circuit is opened or closed by this device when the tube 37 is hotter than the rod 38, or when the tube 37 is cooler than the rod 38 respectively.

The spring arms or contact arms 25 and 29, see Figure 5, tend to follow the rocking lever 40 and its contact members 26 and 30, as such rocking lever is moved. To limit or predetermine the amount of follow through of these contact members 25 and 29, adjustable means are provided. This adjustable means may consist of a pair of levers 76 and 77 which are pivoted intermediate their ends upon the insulating base portion 78 of the member T₂.

The levers 76 and 77 carry at their free ends or lower ends as shown in Figure 5, outwardly projecting pins 79 and 80 respectively which are adapted to engage downwardly turned lips 81 and 82 respectively secured to the spring arms 25 and 29.

The levers 76 and 77 are forged and engage eccentrically located pins 83 and 84 carried respectively by adjustable, revolubly mounted members 85 and 86. It is obvious that when the pins 79 and 80 are moved outwardly, that the follow through of the spring contact members 25 and 29 is more greatly limited than if the pins 79 and 80 are moved inwardly towards each other.

Referring to Figure 3, it will now be understood how the individual elements of this system function. Their relative or correlated functioning will now be described with reference to Figure 3. The position of the main thermostat T₁, for example the room thermostat as shown in Figure 3, is its normal position when the room is at the desired temperature. A slight decrease in temperature of the room causes the thermostat to engage the stationary contact 28 and this closes the circuit of the opening motor through the step by step member T₂ as previously described. This opening motor then operates in the direction indicated and rotates the cam 4 so as to raise the lever 16. This operation continues until the limit switch 15 closes, at which time the circuit of the electric valve 6 will be closed independently of the room thermostat T₁ or of the member T₂. When the main on and off valve 6 opens, see Figures 1 and 2, it is apparent that the modulating regulator will move to fully open position as previously described, as the chamber 60 of the modulating regulator, see Figure 2, is directly connected to the outlet chamber 54 of the modulating regulator and consequently the pressure fluid in such chamber 60 is immediately exhausted. The modulating regulator when in fully open position supplies the fuel at predetermined regulated pressure.

The time delay device D slowly moves to closed position and after an interval of time, cuts off this by-pass from the chamber 60 to the chamber 54 of the modulating regulator. Thereafter the modulating regulator is under the control of the auxiliary throttling valve 5 and assumes a position corresponding to that of the auxiliary throttling valve 5. The adjustment of the parts shown in Figure 3 may be such that the auxiliary throttling valve 5 has not yet been opened and if this is the case, only a minimum flow may be permitted through the modulating regulator after the initial full flow has occurred as the modulating regulator will now move back to closed position and the only communication from the inlet chamber 53 to the outlet chamber 54 thereof will be by way of the passage 62, see Figure 2. The adjustment of the parts in Figure 3, particularly of the member 19 and the contact 13, may be so made that the auxiliary throttling valve 5 is partly open at the time that the main on and off valve is opened, in which case the modulating regulator will also move to partly open position instead of fully closed position after the modulating regulator has first moved to fully open position as previously described.

The opening motor slowly drives the cam 4 to more fully open the auxiliary throttling valve 5 and the modulating regulator. However, the thermally actuated time delay means or step by step means T₂ comes into play as it is heated by the gases in the flue pipe and consequently will open the opening motor circuit until the temperature of the rod 38 approaches that of the tube 37, and thus a step by step opening of the auxiliary throttling valve and modulating regulator will be obtained and over-shooting cannot occur.

The necessity for the step by step action of the apparatus T₂ is apparent when it is considered that furnaces are relatively massive and that a quantity of heat is stored up in the furnace prior to a response of the room temperature and consequently there is over-shooting under normal conditions. With this invention, however, the heat is allowed to be supplied in a step by step manner so that a certain amount of heat is furnished and thereafter the step by step device T₂ stops further increase in the amount of fuel supplied and maintains the fuel supply at the level at which it stopped. If this is sufficient, nothing further happens, but if it is either insufficient or more than required, the step by step device T₂ will, after a period of time, reconnect the opening motor in circuit and adjust the fuel supply appropriately. On the other hand, if the closing motor had been in operation and had been causing a gradual closing of the modulating regulator, it is apparent that the step by step device would interrupt the circuit of the closing motor at periodic intervals to prevent too rapid a cooling.

Figure 7:
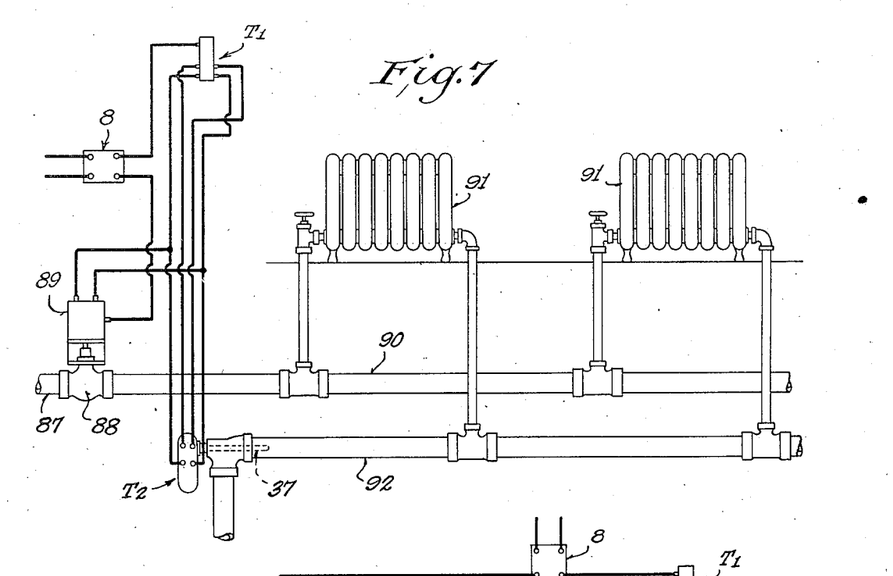
Figure 7 is a view of a further form of the invention showing the system as applied to the direct control of a heating medium.

The invention may take other forms. For instance as shown in Figure 7, the invention is shown as applied to a system of control in which the step by step or thermal time delay means is actuated by the return flow of a heating medium, which, for instance, may be steam or hot water. For example, if hot water is employed, it is supplied from the supply pipe 87 to a modulating valve or throttling valve 88.

This throttling valve is operated in reverse directions by the opening and closing motors in exactly the same way that the opening and closing motors drive the shaft 3, and obviously it may be of any form desired provided, however, that the opening motor will open the valve and the closing motor close the valve through some form of reduction gearing to have a relatively slow opening and a relatively slow closing.

This motor means is indicated generally by the reference character 89 and may correspond to that shown in Figure 3. Under these conditions it is not necessary to have an on and off valve as previously described and indicated generally at 6 in Figure 3, for all that is necessary is to throttle the flow of the heating medium to a greater or less extent or to cut it off completely and this is readily accomplished by the opening and closing motor means heretofore described.

The electrical connections are identically the same as those shown in Figure 3, with the exception, as stated, that there is no on and off main valve corresponding to the valve 6 of Figure 3 and that there is no limit control 9 associated therewith. The heating medium passes from the throttling valve or regulating valve 88 to the pipe line 90 and from there passes to one or more radiators 91. Each radiator may be provided with an individual manually operable cut off valve as indicated if desired, or these manual valves may be omitted. The return pipe for the heating medium is indicated by the reference character 92 and the step by step member has its thermally responsive portion located within this return pipe as indicated in Figure 7.

The operation of the system shown in Figure 7 is believed to be apparent from the previous description of Figure 3, except for the on and off valve and except for the fact that there is no auxiliary throttling valve corresponding to the valve 5 of Figure 3. Instead, the throttling valve is the main valve 88 which controls the flow of heating medium directly.

In the system shown in Figure 7 it is apparent that when the thermostat $T_1$, corresponding identically to that shown in Figure 3, calls for more heat, the opening motor will start opening the valve 88 and thereafter the step by step or thermal time delay means $T_2$ will function to temporarily arrest the operation of the opening motor. Further operation of the opening motor will then stop. If the flow of the heating medium is sufficient, nothing further happens, but the throttling valve 88 or regulating valve will remain in its adjusted position.

On the other hand, if there is an insufficient flow of heating medium, the room thermostat $T_1$ will remain in the position where it calls for more heat. For example, it will be to the left as viewed in Figure 3. Under these conditions when the step by step member $T_2$ again closes the opening motor circuit, after an interval of time as previously described, the regulating or throttling valve 88 will open farther and thereafter the operation of the opening motor will be arrested by the functioning of the step by step or thermal time delay means $T_2$.

This cycle will continue until either the full opening position of the regulating or throttling valve 88 has been obtained, at which time the corresponding limit switch will open, or until the room thermostat $T_1$ moves to open position due to the temperature of the room having reached the desired temperature for which the device is set.

The reverse action is, of course, apparent from the previous description, for if the room thermostat moves to the right as viewed in Figure 3, it is apparent that the closing motor will function and the regulating or throttling valve 88 will start to close but will be arrested periodically by the functioning of the device $T_2$, all as previously described.

This invention lends itself readily to the correct relative proportioning of hot and cold air which may be supplied a building in certain types of heating and ventilating installations. Under these conditions, the shaft 3 is provided with a crank 93, see Figure 8, the opening and closing motor mechanism being indicated generally by the reference character 94. This crank is connected by means of the connecting rod 93′ with a plurality of butterfly valves or vanes 95 controlling the supply of hot air, and with a plurality of butterfly valves or vanes 96 controlling the supply of cold air.

Figure 8:
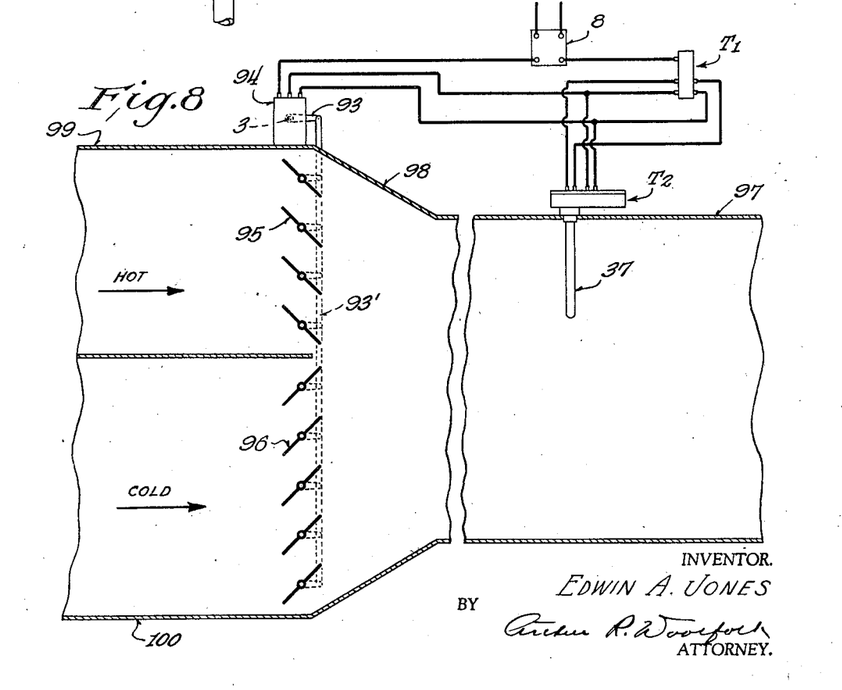
Figure 8 is a diagrammatic view showing the system as applied to the control of a mixture of hot and cold air.

These valves or shutters are so arranged that they work in opposite directions so that motion of the shaft 3 in one direction will tend to cut off the supply of hot air and increase the supply of cold air, and the reverse direction will cause the valves to increase the supply of hot air and decrease the supply of cold air. The room thermostat is indicated at $T_1$ and functions in exactly the same manner as that previously described and the step by step member or thermal time delay means is indicated at $T_2$ and functions in exactly the same manner as previously described. Its thermally sensitive portion is located in the mixed air supply pipe 97 at a point some distance from the converging portion 98 so that adequate mixing of the hot and cold air supplied will have occurred prior to the arrival of the mixed air at the step by step member $T_2$. The hot air supply pipe is indicated by the reference character 99 and the cold air supply pipe by the reference character 100.

It is apparent that if the room temperature should drop below that for which the device is set, that the opening motor will function to increase the supply of hot air and to decrease the supply of cold air. The opening of the hot air valves and the simultaneous closing of the cold air valves takes place slowly and is arrested, after a suitable interval of time, by the functioning of the step by step thermal time delay means $T_2$ as previously described to thereby avoid overshooting.

On the other hand, if the room thermostat called for a decrease in temperature, it is apparent that the closing motor would function to decrease the supply of hot air and increase the supply of cold air, and that again the thermal time delay or step by step means $T_2$ would function to stop the operation of the closing motor after an interval of time so that the system functions in a step by step manner to feel out, so to speak, the demand either during an increasing or decreasing temperature cycle. It is to be understood that where the expressions hot air and cold air are used, it is intended that they shall be interpreted to mean air of different temperatures.

It is to be understood, in connection with the invention described in Figures 7 and 8, that the room thermostat or main thermostat $T_1$ is identically like that described in connection with Figure 3 and cooperates with the step by step thermal time delay means $T_2$ in exactly the same manner. Thus, if there is a sudden increase or a sudden decrease of temperature in the room due to abnormal causes, the step by step thermal time delay means will be electrically by-passed by the room thermostat and maximum opening or closing of the motor means will occur.

It will be seen that a novel control means and a novel system of control for heat exchange devices has been provided whereby over-shooting is effectively prevented whereby a very uniform temperature is maintained.

It will be seen further that although this invention accomplishes the many results hereinabove described in detail, that nevertheless the system is relatively simple and employs comparatively simple devices.

Although this invention has been described in considerable detail, it is to be understood that such description is intended as illustrative rather than limiting, as the invention may be variously embodied and is to be interpreted as claimed.

I claim:

1. In a control system for heating devices including burner means, a main thermostat responsive to the temperature produced by said burner means, on and off valve means controlled from said thermostat for controlling the supply of an ingredient of a combustible mixture to said burner means, an auxiliary valve controlling the supply of said ingredient to said burner means, electrical power means for operating said auxiliary valve in both directions, and time delay thermostatic means for causing a step by step action of said auxiliary valve, said time-delay means being disposed to be operated in response to changes in temperature produced by the burner.

2. In a control system for heating devices including burner means, a main thermostat responsive to the temperature produced by said burner means, an on and off valve controlled from said main thermostat for controlling the supply of an ingredient of a combustible mixture to said burner means, an auxiliary valve controlling the supply of said ingredient to said burner means, electrical motor means for operating said auxiliary valve in opposite directions, and thermostatic means acting intermittently upon rapid change in temperature changes produced by the burner, operatively connected for causing intermittent operation of said auxiliary valve to temporarily arrest the increase or decrease of the supply of said one ingredient to said burner means upon a rapid increase or decrease, respectively, of the heat supplied by said burner means.

3. In a control system for heating devices including burner means, a main thermostat responsive to the temperature produced by said burner means, a valve for causing modulation of the supply of one ingredient of a combustible mixture to said burner means, electrical motor means for moving said valve towards open and closed positions, said electrical motor means including two electric motors arranged to rotate in reverse directions, and reduction gearing operatively connecting said motors, with said valve, said electrical motor means being controlled by said main thermostat, time delay thermostatic means heated from said burner means for causing intermittent operation of said motor means to thereby cause a temporary cessation of operation of said electrical motor means upon rapid change of temperature produced by said burner means, a main electrical on and off valve for controlling the supply of the said ingredient to said burner means, and a limit switch operated from said motor means for controlling said main on and off valve.

4. In a control system for a heating device, a source of supply of a heating medium, a main thermostat responsive to the temperature produced by said heating device, a valve for causing direct modulation of the supply of said heating medium to said heating device, electrical motor means for moving said valve towards open and closed positions, said electrical motor means being controlled by said main thermostat, and time delay thermostatic means operated from an initial to a second position in response to temperature changes produced in the heating medium at rates above a predetermined value, and operated back to initial position upon reduction of rate of temperature change to below said value, said time-delay thermostatic means being connected to cause a temporary cessation of the operation of said motor means upon rapid change of temperature produced, said time delay thermostatic means being heated from the heating medium which passes through said heating device.

5. In a control system for a heating device, a source of supply of a heating medium, a main thermostat responsive to the temperature produced by said heating device, a valve for causing direct modulation of the supply of said heating medium to said heating device, electrical motor means for moving said valve towards open and closed positions, said electrical motor means being controlled by said main thermostat, and time delay thermostatic means operated from an initial to a second position in response to temperature changes produced in the heating medium at rates above a predetermined value, and operated back to initial position upon reduction of rate of temperature change to below said value, said time-delay thermostatic means being connected to cause a temporary cessation of the operation of said motor means upon rapid change of temperature produced, said time delay thermostatic means being more directly heated from said heating medium than said main thermostat.

6. In a system of control a source of hot air and a source of cold air, means for conducting a mixture of the air from the two sources to a space whose temperature is to be controlled, a main thermostat located within said space, valve means for varying the proportion of hot and cold air, electrical motor means for moving said valve means to vary the proportion of said hot and cold air, said electrical motor means being controlled from said main thermostat, and time delay thermostatic means heated by the mixture of the hot and cold air while said hot and cold air is being conducted to the said space, said time delay thermostatic means controlling said motor means and operated from an initial to a second position in response to temperature changes in the air to which it is subjected at rates above a predetermined value, and operated back to initial position upon reduction of rate of temperature change to below said value, said time-delay thermostatic means being connected to cause intermittent operation of said motor means upon rapid change of temperature of the air while it is being conducted to the said space.

7. In a system of control a source of hot air and a source of cold air, means for conducting a mixture of the air from the two sources to a space whose temperature is to be controlled, a main thermostat located within said space, valve means for varying the proportion of hot and cold air, electrical motor means for moving said valve means to vary the proportion of said hot and cold air, said electrical motor means including two electric motors arranged to rotate in reverse directions, and reduction gearing operatively connecting said motors with said valve means, said electrical motor means being controlled from said main thermostat, and time delay thermostatic means heated by the mixture of the hot and cold air while said hot and cold air is being conducted to the said space, said time delay thermostatic means controlling said motor means and operated from an initial to a second position in response to temperature changes in the air to which it is subjected at rates above a predetermined value, and operated back to initial position upon reduction of rate of temperature change to below said value, said time-delay thermostatic means being connected to cause intermittent operation of said motor means upon rapid change of temperature of the air while it is being conducted to the said space.

8. In a control system for heating devices including heating means for heating a medium, a main thermostat responsive to the temperature of said medium, time delay thermostatic means responsive to the heat from said heating means more quickly than said main thermostat and including two members each of which expands on heating and one of which heats up more quickly than the other and switch means operated by the difference in expansion of said members, said switch means being operated from a first to a second position upon rapid change of heat applied to the two members, and being operated back to first position upon continued application of heat thereto, valve means controlling the operation of said heating means and including electrical power means for operating said valve means in a graduated manner, said electrical power means being under the control of said main thermostat and said time delay thermostatic means switch.

9. In a control system for heating devices including heating means for heating a medium, a main thermostat responsive to the temperature of said medium, time delay thermostatic means responsive to the heat from said heating means more quickly than said main thermostat and including two members each of which expands on heating and one of which heats up more quickly than the other and switch means operated by the difference in expansion of said members, valve means controlling the operation of said heating means and including electrical power means for operating said valve means in a graduated manner, said electrical power means being under the control of said main thermostat and said time delay thermostatic means, said main thermostat having two sets of contacts one of which opens and closes for normal variations in temperature of said medium and the other of which opens and closes for abnormal temperature variations, said last mentioned set of contacts being connected in a circuit which by-passes said time delay thermostatic means.

10. In a control system for heating devices including burner means, a main thermostat responsive to the temperature produced by said burner means, on and off valve means controlled from said thermostat for controlling the supply of an ingredient of a combustible mixture to said burner means, an auxiliary valve controlling the supply of said ingredient to said burner means, means for positively operating said auxiliary valve in both directions, and time delay thermostatic means operatively connected to said last means located in the heating system to be responsive to heat changes produced by the burner means to cause temporary cessation of said operating means upon receiving rapid increase or decrease of heat from the burner means for causing a step by step action of said auxiliary valve.

11. In a control system for heating devices including burner means, a main thermostat responsive to the temperature produced by said burner means, a valve for causing modulation of the supply of one ingredient of a combustible mixture to said burner means, means for moving said valve towards open and closed positions, said means being controlled by said main thermostat, and time delay thermostatic means heated from said burner means for causing intermittent operation of said means to thereby cause a temporary cessation of the operation of said means upon rapid change of temperature produced by said burner means, said time delay thermostatic means being more directly heated from said burner means than said main thermostat said time delay means comprising a mechanism moved from first to second position upon initial heat change, and moved from second to first position upon continued heat change, and in said second position being adapted to stop said burner means as aforesaid.

12. In a control system for heating devices including heating means for heating a medium, a main thermostat responsive to the temperature of said medium, a main on and off valve controlled from said main thermostat, time delay thermostatic means responsive to the heat from said heating means more quickly than said main thermostat and including two members each of which expands on heating and one of which heats up more quickly than the other and switch means operated by the difference in expansion of said members, said switch means being operated from a first to a second position upon rapid change of heat applied to the two members, and being operated back to first position upon continued application of heat thereto, valve means controlling the operation of said heating means and including electrical power means for operating said valve means in a graduated manner, said electrical power means being under the control of said main thermostat and said time delay thermostatic means.

13. In a control system for heating devices including heating means for heating a medium, a main thermostat responsive to the temperature of said medium, a main on and off valve controlled from said main thermostat, time delay thermostatic means responsive to the heat from said heating means more quickly than said main thermostat and including two members each of which expands on heating and one of which heats up more quickly than the other and switch means operated by the difference in expansion of said members, said switch means being operated from a first to a second position upon rapid change of heat applied to the two members, and being operated back to first position upon continued application of heat thereto, valve means controlling the operation of said heating means and including electrical power means for operating said valve means in a graduated manner, said electrical power means being under the control of said main thermostat and said time delay thermostatic means, said main thermostat having two sets of contacts one of which opens and closes for normal variations in temperature of said medium and the other of which opens and closes for abnormal temperature variations, said last mentioned set of contacts being connected in a circuit which by-passes said time delay thermostatic means.

14. In a control system for heating devices including burner means, a main thermostat responsive to the temperature produced by the burner means, a modulating valve for controlling a supply of an ingredient of a combustible mixture to the burner means, an auxiliary valve for controlling the position of the modulating valve, means for selectively operating said auxiliary valve in both closing and opening directions, and time delay thermostatic means operatively connected to said operating means and into the heating system to effect intermittent cessation of operation of said operating means for effecting a step by step action of the auxiliary valve and, therethrough, the modulating valve, said time delay means comprising a mechanism moved from first to second position upon initial heat change, and moved from second to first position upon continued heat change, and in said second position being adapted to stop said burner means as aforesaid said auxiliary valve and said modulating valve maintaining achieved positions during cessation of the operating means.

15. In a control system for heating devices including burner means, a main thermostat responsive to the temperature produced by said burner means, a valve for causing modulation of the supply of one ingredient of a combustible mixture to said burner means, electrical motor means for moving said valve towards open and closed positions, said electrical motor means being controlled by said main thermostat, and time-delay thermostatic means operated from an initial to a second position in response to temperature changes produced by the burner means at rates above a predetermined value, and operated back to initial position upon reduction of rate of temperature change to below said value, said time-delay means being connected to cause a temporary cessation of the operation of said electrical motor means upon rapid change of temperature produced by said burner means, said valve maintaining its previously achieved position during temporary cessation of the motor means, and the time-delay thermostatic means being adapted to return to initial position upon reduction of rate of change of said temperature, to return the electrical motor means to control of the main thermostat.

16. In a control system for heating devices including burner means, a main thermostat responsive to the temperature produced by said burner means, a valve for causing modulation of the supply of one ingredient of a combustible mixture to said burner means, electrical motor means for moving said valve towards open and closed positions, said electrical motor means being controlled by said main thermostat, and time-delay thermostatic means operated from an initial to a second position in response to temperature changes produced by the burner means at rates above a predetermined value, and operated back to initial position upon reduction of rate of temperature change to below said value, said time-delay means being connected to cause a temporary cessation of the operation of said electrical motor means upon rapid change of temperature produced by said burner means, said valve maintaining its previously achieved position during temporary cessation of the motor means, and the time-delay thermostatic means being adapted to return to initial position upon reduction of rate of change of said temperature, to return the electrical motor means to control of the main thermostat, said time-delay thermostatic means being more direcly heated from said burner means than said main thermostat.

17. In a control system for heating devices including burner means, a main thermostat responsive to the temperature produced by said burner means, a valve for causing modulation of the supply of one ingredient of a combustible mixture to said burner means, electrical motor means for moving said valve towards open and closed positions, said electrical motor means including two electric motors arranged to rotate in reverse directions, and reduction gearing operatively connecting said motors with said valve, said electrical motor means being controlled by said main thermostat, and time-delay thermostatic means operated from an initial to a second position in response to temperature changes produced by the burner means at rates above a predetermined value, and operated back to initial position upon reduction of rate of temperature change to below said value, said time-delay means being connected to cause a temporary cessation of the operation of said electrical motor means upon rapid change of temperature produced by said burner means, said valve maintaining its previously achieved position during temporary cessation of the motor means, and the time-delay thermostatic means being adapted to return to initial position upon reduction of rate of change of said temperature, to return the electrical motor means to control of the main thermostat.

18. In a control system for heating devices including burner means, a main thermostat responsive to the temperature produced by said burner means, a valve for causing modulation of the supply of one ingredient of a combustible mixture to said burner means, electrical motor means for moving said valve towards open and closed positions, said electrical motor means including two electric motors arranged to rotate in reverse directions, and reduction gearing operatively connecting said motors with said valve, said electrical motor means being controlled by said main thermostat, and time-delay thermostatic means operated from an initial to a second position in response to temperature changes produced by the burner means at rates above a predetermined value, and operated back to initial position upon reduction of rate of temperature change to below said value, said time-delay means being connected to cause a temporary cessation of the operation of said electrical motor means upon rapid change of temperature produced by said burner means, said valve maintaining its previously achieved position during temporary cessation of the motor means, and the time-delay thermostatic means being adapted to return to initial position upon reduction of rate of change of said temperature, to return the electrical motor means to control of the main thermostat, said main thermostat having means for by-passing said time-delay thermostatic means when the temperature adjacent said main thermostat varies beyond a predetermined amount.

19. In a control system for heating devices including burner means, a main thermostat responsive to the temperature from said burner means, a main modulating valve for modulating the supply of one ingredient of a combustible mixture to said burner means, an auxiliary modulating valve controlling said main modulating valve, electrical motor means for moving said auxiliary valve towards open and closed positions, said electrical motor means including two electric motors arranged to rotate in reverse directions, and reduction gearing operatively connecting said motors with said auxiliary valve, said electrical motor means being controlled by said main thermostat, and time-delay thermostatic means operated from an initial to a second position in response to temperature changes produced by the burner means at rates above a predetermined value, and operated back to initial position upon reduction of rate of temperature change to below said value, said time-delay means being connected to cause a temporary cessation of the operation of said motor means upon rapid change of temperature provided by said burner means, said valve maintaining its previously achieved position during temporary cessation of the motor means, and the time-delay thermostatic means being adapted to return to initial position upon reduction of rate of change of said temperature, to return the electrical motor means to control of the main thermostat.

20. In a mechanism of the kind described, a heat-change producing means for effecting heat changes in a space, means for varying the heat-change effect of the heat-change producing means, a first control operable into open and closed positions in response to the temperature condition of the space, and a second control operable in response to changes in temperature occurring at rates above a predetermined value, to move from a closed to an open position, and operable upon failure of temperature to change at such rates, to a closed position, said second control being disposed to be responsive to rate of change of temperature produced by the heat-change producing means, and means connecting both controls with the varying means to produce operation thereof only when both are closed, whereby upon demand for heat change at the first control, the heat-change producing device may operate intermittently.

21. In a mechanism of the kind described, means to control the operation of a heat-change producing device to determine the operation thereof to produce heat-changes in a given space, a first thermostatic device in the space operable from open to closed position in accordance with temperature conditions in the space, a second thermostatic device disposed to receive heat-changes produced by the medium as distinguished from those ultimately produced in the space, said second thermostatic device being adapted to operate from closed to open position and back to closed position upon continued substantial change in one direction, in temperature thereat, but always to operate to closed position upon cessation of change in temperature thereat, means connecting said first and second thermostatic devices with the heat-change producing device to determine operation thereof only when both are closed, whereby upon demand for heat-change at the first thermostatic device, the heat-change producing device may operate intermittently until the demand is satisfied.

22. In a mechanism of the kind described, means to control the operation of a heat-change producing device to determine the operation thereof to produce heat-changes in a given space, a first thermostatic device in the space operable from open to closed position in accordance with temperature conditions in the space, a second thermostatic device disposed to receive heat-changes produced by the medium as distinguished from those ultimately produced in the space, said second thermostatic device being adapted to operate from closed to open position and back to closed position upon continued substantial change in one direction, in temperature thereat, but always to operate to closed position upon cessation of change in temperature thereat, means connecting said first and second thermostatic devices with the heat-change producing device to determine operation thereof only when both are closed, whereby upon demand for heat-change at the first thermostatic device, the heat-change producing device may operate intermittently until the demand is satisfied, with means in the second control to adjust the amount of change in temperature required to shift the same from one position to another.

23. In a mechanism of the kind described, a heat-change producing means operable for effecting temperature changes in a space that is subject to reverse changes in temperature when the heat-change producing means is inoperative, means for varying the heat-change effect of the heat-change producing means, a first control operable to open and closed positions in response to the temperature condition of the space, a second control operable in response to changes in temperature in either direction, above a predetermined value, to move from a first position to a second position, and operable upon failure of temperature to change at such rates, to a closed position, said second control being disposed to be responsive to rate of change in temperature produced by operation or cessation of the heat-change producing means, means connecting both controls with the varying means to determine operation thereof only when the first control is closed and the second is in its first position, whereby upon demand for heat change at the first control, the heat-change producing means may operate intermittently, means to adjust the second control to obtain variations in amount of change in temperature required to effect operation of said second control, said adjusting means including mechanism to produce a different amount of change required to operate from first to second position than from second to first.

24. In a control system for controlling the temperature of a desired place, a heat-change producing means, means conducting an ingredient to the heat-change producing means to cause the same to operate and produce heat changes, a main thermostat responsive to the heat changes produced, and located in the space, a control in the ingredient conducting means to cause modulation of the supply thereof to the heat-change producing means, electrical means operable in opposite directions to move the control toward open and closed positions, said main thermostat controlling said electrical means and control to start the control moving toward open or closed position in accordance with whether the temperature of the place is above or below a predetermined value, and time-delay thermostatic means operated from an initial to a second position in response to temperature-changes produced by the heat-change producing means at rates above a predetermined value, and operated back to initial position upon reduction of rate of temperature change to below said value, said time-delay thermostatic means being connected with the electrical means to produce delay in continued operation thereof during such time as the time-delay thermostatic means is in second position, and to return the electrical means to control of the main thermostat when the time-delay thermostatic means returns to initial position.

EDWIN A. JONES.